(12) United States Patent
Proch et al.

(10) Patent No.: US 8,757,638 B2
(45) Date of Patent: Jun. 24, 2014

(54) COMPACT LIGHTWEIGHT FLEXIBLE DISPOSABLE GAME CARRYING SLED

(75) Inventors: Jason Christopher Proch, Cranberry Township, PA (US); Kathy Stump Proch, Cranberry Township, PA (US)

(73) Assignee: Altus Brands, LLC, Grawn, MI (US)

( * ) Notice: Subject to any disclaimer, the term of this patent is extended or adjusted under 35 U.S.C. 154(b) by 517 days.

(21) Appl. No.: 12/944,369

(22) Filed: Nov. 11, 2010

(65) Prior Publication Data

US 2011/0278805 A1 Nov. 17, 2011

Related U.S. Application Data

(60) Provisional application No. 61/260,985, filed on Nov. 13, 2009.

(51) Int. Cl.
*B62B 13/16* (2006.01)

(52) U.S. Cl.
USPC .............................. 280/18; 280/20; 224/921

(58) Field of Classification Search
USPC .................... 280/18, 19, 20, 845; 5/627, 628; 224/921; 119/725
See application file for complete search history.

(56) References Cited

U.S. PATENT DOCUMENTS

| | | | |
|---|---|---|---|
| 1,711,167 A * | 4/1929 | Blake ............................ | 182/230 |
| 2,592,771 A | 4/1952 | Wampler | |
| 3,038,644 A | 6/1962 | Johnson | |
| 3,077,292 A | 2/1963 | Gehrke | |
| 3,222,080 A | 12/1965 | Kindaide | |
| 3,282,375 A | 11/1966 | Ray | |
| 3,346,154 A | 10/1967 | Bishop | |
| 3,547,456 A | 12/1970 | Sapp | |
| 3,771,808 A | 11/1973 | Duerst | |
| 4,046,393 A | 9/1977 | Vadnais | |
| 4,132,427 A | 1/1979 | McGee | |
| 4,283,068 A | 8/1981 | Keyser | |
| 4,321,982 A | 3/1982 | Strickland | |
| 4,335,891 A | 6/1982 | Alley et al. | |
| 4,431,121 A | 2/1984 | Bensette | |
| 4,754,825 A | 7/1988 | Scheffer | |
| 4,887,823 A | 12/1989 | Hallett et al. | |
| 5,029,921 A | 7/1991 | Houghton et al. | |
| 5,104,133 A * | 4/1992 | Reiner ........................... | 280/19 |
| 5,145,224 A | 9/1992 | Welk | |
| D334,093 S | 3/1993 | Fredeman | |
| 5,295,556 A | 3/1994 | Mullin | |
| 5,433,291 A | 7/1995 | Shoestock, Sr. | |
| 5,492,196 A | 2/1996 | Michno | |
| 5,529,321 A * | 6/1996 | Thompson ...................... | 280/19 |

(Continued)

*Primary Examiner* — Katy M Ebner
*Assistant Examiner* — Emma K Frick
(74) *Attorney, Agent, or Firm* — Blynn L. Shideler; Krisanne Shideler; BLK Law Group

(57) ABSTRACT

A compact lightweight flexible disposable game carrying sled comprises a flexible high density polyethylene sheet configured to receive game thereon and be dragged along the ground during transport of the game. A plurality of sets of holes defining lines are in spaced locations along the sheet. A plurality of tie down lines are included, with each tie down line weaving through one set of holes to couple the line to the flexible sheet. The tie down lines are configured to completely encircle the game to secure the game to the sheet. A plurality of intersecting uniform material thickness fold lines extend across the sheet, allowing the sheet to be folded to form a compact structure for storage and for transport when not in use and unfolded when the game carrying sled is to be used.

18 Claims, 3 Drawing Sheets

(56) References Cited

U.S. PATENT DOCUMENTS

| | | | |
|---|---|---|---|
| 5,713,497 A | 2/1998 | Ponczek | |
| 5,848,816 A | 12/1998 | Hancock | |
| 5,887,676 A | 3/1999 | Harbin | |
| 6,089,636 A | 7/2000 | Harris | |
| 6,129,399 A | 10/2000 | Burch, Sr. | |
| 6,253,569 B1 * | 7/2001 | Hall | 62/457.2 |
| 6,260,864 B1 | 7/2001 | Smith | |
| 6,276,698 B1 | 8/2001 | Calandra | |
| 6,457,763 B2 | 10/2002 | Cornelius | |
| 6,508,077 B1 * | 1/2003 | Vander Boegh et al. | 62/457.2 |
| 6,516,919 B1 | 2/2003 | Sempel | |
| 6,565,101 B2 * | 5/2003 | Jones et al. | 280/19 |
| 6,755,454 B1 | 6/2004 | Cary | |
| 6,889,882 B1 | 5/2005 | Leep | |
| 7,547,024 B1 | 6/2009 | Dell | |
| 7,785,008 B2 * | 8/2010 | Schoenig et al. | 383/4 |
| 7,832,743 B2 * | 11/2010 | Small | 280/19 |
| 8,066,163 B2 * | 11/2011 | Newcomb | 224/576 |
| 8,091,937 B2 * | 1/2012 | Mastromatto et al. | 294/152 |
| 8,286,284 B2 * | 10/2012 | Fee et al. | 5/628 |
| 8,365,326 B2 * | 2/2013 | Kenalty et al. | 5/628 |
| 2005/0189747 A1 * | 9/2005 | Khandhadia et al. | 280/730.2 |
| 2007/0278754 A1 * | 12/2007 | Walkingshaw et al. | 280/20 |
| 2008/0018067 A1 * | 1/2008 | Small | 280/19 |
| 2009/0233535 A1 | 9/2009 | Boduch | |
| 2012/0074679 A1 * | 3/2012 | Kinsey | 280/845 |

\* cited by examiner

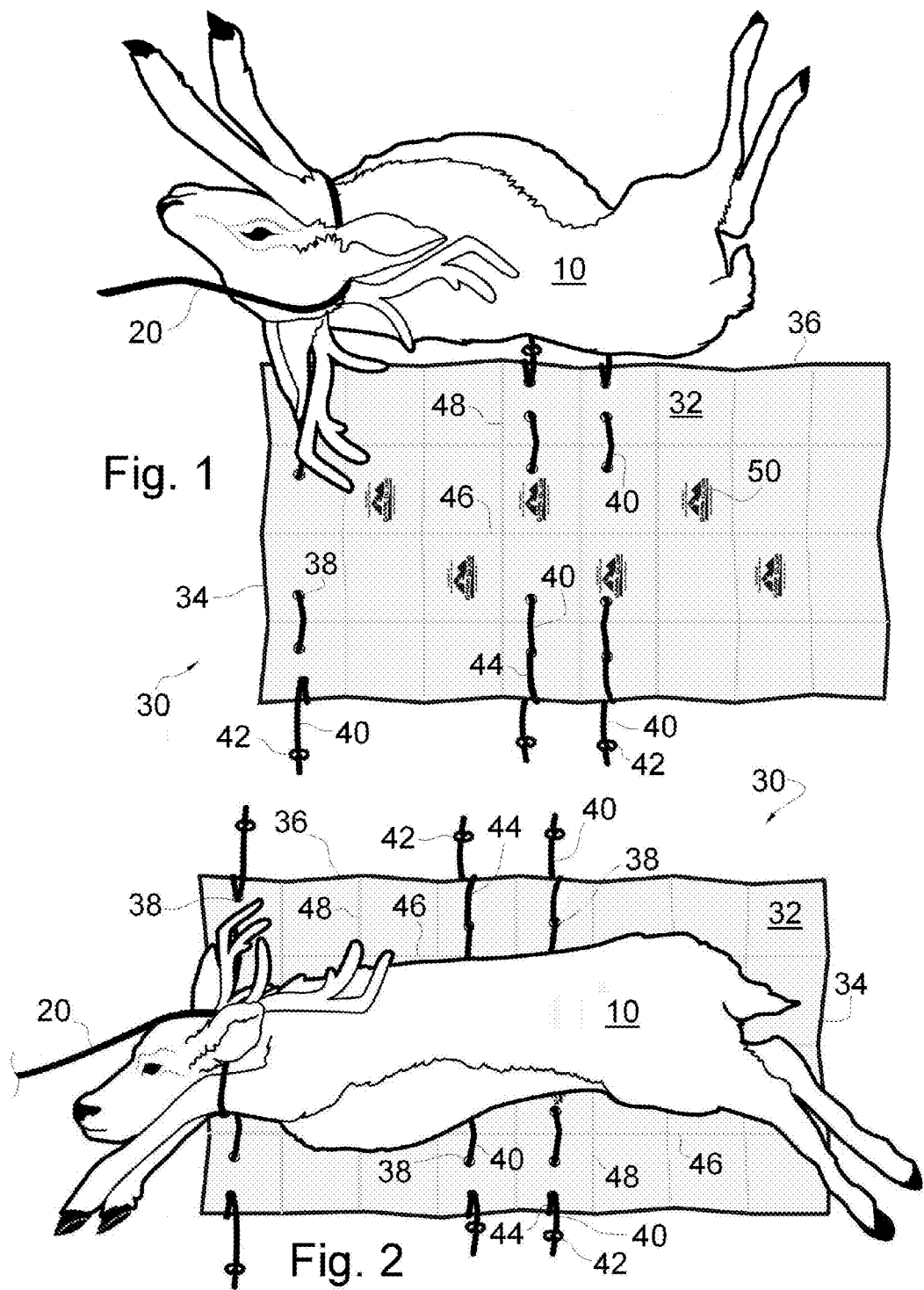

COMPACT LIGHTWEIGHT FLEXIBLE DISPOSABLE GAME CARRYING SLED

RELATED APPLICATIONS

The present application claims the benefit of U.S. Provisional Patent Application Ser. No. 61/260,985 entitled "A Device Used to Reduce the Force Needed to Drag and Animal across the Ground" filed on Nov. 13, 2009.

BACKGROUND OF THE INVENTION

1. Field of the Invention

The present invention relates to hunters accessories namely to a compact, lightweight, flexible disposable game carrying sled to assist hunters in transporting game from generally remote hunting locations.

2. Background Information

Game hunting is a popular recreational activity and it is the larger game animals, such as deer, antelope, moose, elk, bear, sheep, goats and the like, that receive the most attention from hunters (and of these popular game, deer represent, by far, the most popular game). These larger game animals often reside in remote areas. Hunters often travel by foot into wilderness areas to hunt big game. When the animals have been killed, there is a need to pull the animals out of these wilderness areas because many of these areas are inaccessible to vehicles, although ATVs are used to reach places which cars and trucks cannot. Trail-less areas cannot be easily reached even by ATVs. Further, select areas may be "protected" by government regulation or by property owner's requirement that will restrict or prohibit ATV access. In such situations, the harvested game is generally dressed out, or eviscerated, in the field (i.e., "field dressed"), and then towed to a road (or access area) where a vehicle may be brought in order to transport the carcass out of the area.

Transporting the game to the road, however, after it is killed and field dressed is often a major undertaking. Once the quarry is taken, there is the task of transporting the carcass back to a point that is accessible with a vehicle of some type. Often the hunter must move the quarry across rough terrain to bring it to an access point. Due to the size and weight of the medium and large game which is often hunted, and the rugged terrain over which it may be necessary to tow the harvested game, a single person may find it extremely difficult to tow an animal along the ground. Without assistance, dragging a game such as a deer presents a large amount of physical stress to the body, sometimes resulting in heart attack and death. Furthermore, the harvested animal will become dirty, battered, and torn as it is towed along. Rocks and other rough objects may tear or otherwise damage the skin.

There have been a number of devices, herein classified as Game Carriers to assist hunters in this transporting of the game and reduce the physical stress associated with transporting harvested game. The first broad category within the meaning of this patent application is a motorized self-propelled game cart, the most common example of which is an ATV with a game carrying attachment which carries both the hunter and the game. A motorized game cart need not accommodate the hunter and may be a self propelled cart. An example of such a non-passenger type motorized game cart is shown in U.S. Pat. No. 4,754,825, which is incorporated herein by reference, entitled "game sled" that uses a winch to power the game carrier and pull the game carrier over the terrain.

The second class of Game Carriers to assist hunters in the transporting of game is a game cart, namely a wheeled frame that the hunter can use to transport the game out of the remote location. Representative examples of game carts are illustrated in U.S. Pat. Nos. 6,260,864; 6,516,919; 5,887,676; 5,492,196; 5,433,291; 5,295,556; 4,321,982; and 3,282,375, which are incorporated by reference.

A third class of game carriers that can be used for midsize game (that has been long popular in Hollywood movie depictions of indigenous or primitive cultures) is a two person shouldered beam upon which the game is slung. Representative examples of this very old game carrier genre are found in U.S. Pat. No. 5,713,497 and U.S. Patent Publication Number 2009-0233535.

This two person shouldered beam game carrier also called a sling type litter or pole litter, although the term "litter" often has the connotation of human cargo, namely wounded transport. This is similar to a kago (M) which is a Japanese type of sedan chair, suspended by a single crossbeam, carried by two men, usually used to transport one person at a time.

A fourth class of Game Carriers within the meaning of this application is a game drag, which is namely a rope or harness system that is attached to the game and with which the hunters can pull the game. The most common type of game drag is simply a length of rope that the hunter can fasten to the game in a variety of attachment techniques. Representative examples of game drags are illustrated in U.S. Pat. Nos. 6,889,882; 6,755,454; 6,457,763; 6,129,399; 6,089,636; 5,848,816; 5,145,224; 5,029,921; 4,431,121; 3,346,154; 3,077,292; 3,038,644 and 2,592,771 which are incorporated herein by reference.

A final class of Game Carriers within the meaning of this application is a game carrying sled (also called a game skid or "game sled" as noted in the '825 patent discussed above which is classified above as a "motorized game cart" as it is a self-propelled game carrying sled). This is the grouping of Game Carriers in which the present invention is classified, and is generally a device upon which the game is supported and the sled is pulled along the ground. A game drag can be used with a game carrying sled with the game drag attached to the sled or the game. Consequently some game sleds incorporate a game drag into the system.

A very old form or game carrying sled, or general pack sled, is called a travois. A travois is a form of sled made by fastening two long poles together over the back of a horse or dog (or ATV or human), then building a platform near where they drag to support game or any cargo.

U.S. Pat. No. 3,547,456, which is incorporated herein by reference, discloses a game carrying sled including a flexible panel of slippery material fitted with a game drag included with both shoulder straps and hand straps used to drag game from a hunting area. A similar portable game carrying sled with a flexible sheet with a rope handle game drag is disclosed by U.S. Pat. No. 3,771,808, which is incorporated herein by reference.

A portable sled for transporting injured persons or animals is disclosed in U.S. Pat. No. 4,046,393 and is formed of a rolled plastic sheet. U.S. Pat. No. 4,132,427 shows a game carrying sled that includes a fixed frame sled with hold down straps and game drag pulling straps affixed to the front of the sled for pulling an animal secured to the sled. U.S. Pat. Nos. 4,283,068; 4,335,891 and 3,222,080 disclose hard frame game carrying sleds for transporting game animals (or injured individuals).

U.S. Pat. No. 4,887,823, which is incorporated herein by reference, discloses a game carrying sled with a flexible sheet or body that is wrapped around an animal carcass to allow the carcass to slip over the terrain with minimal friction when the game dragged head first.

An ornamental design for a game carrying sled is disclosed in the 1993 U.S. Design Pat. No. D334,093 showing a rigid sled structure.

U.S. Pat. No. 6,276,698, incorporated herein by reference, discloses a collapsible game carrying sled which includes a rigid peripheral frame with a flexible sheet secured there over.

U.S. Pat. No. 7,547,024, incorporated herein by reference, discloses a game carrying sled which includes a polymer sheet formed with eyelets to permit the attachment of straps to fix the carcass to the top surface of the sheet. The polymer sheet is configured to be rolled for storage in a quiver and wherein in use the quiver is placed at the front edge of the sheet to stiffen and round the front edge so as to form a toboggan and game drag attachment point.

The above described rigid or frame sled structures are rather large and add to the overall cost of the device and to the bulk which must be carried into hunting areas by the hunters. The relatively high cost, excess weight, and bulky nature is believed to minimize the commercial success and consumer acceptance of these solutions.

Even the flexible game carrying sled structures disclosed above are difficult to carry into the remote areas in spite of the fact that they may be rolled up into a cylindrical package as shown with the '024 patent design. The '823 design represents a more flexible design than much of the prior art, but even this design is difficult to form into a compact lightweight structure that hunters are willing to carry with them into the woods. Furthermore none of these designs can be manufactured sufficiently inexpensively to effectively form a disposable game carrying sled.

There remains a need in the art to develop a compact, light weight disposable game carrying sled.

SUMMARY OF THE INVENTION

In accordance with one aspect of the present invention, the present invention, in summary, provides a compact lightweight flexible disposable game carrying sled comprising a flexible sheet configured to receive game thereon and be dragged along the ground during transport of the game; a plurality of sets of holes in the flexible sheet at spaced locations along the flexible sheet, with each set of holes including at least two holes along a line; a plurality of tie down lines, each tie down line associated with one set of holes with the tie down line weaving through the set of holes to couple the line to the flexible sheet, and wherein the tie down lines are configured to encircle the game that is placed on the flexible sheet to secure the game to the sheet in use; and a plurality of uniform material thickness fold lines extending across the flexible sheet, wherein at least two of the fold lines intersect, and wherein the flexible sheet is configured to be folded along the fold lines to form a compact structure for storage and for transport when not in use and configured to be unfolded when the game carrying sled is to be used.

As noted, the present invention provides a compact, light weight flexible, disposable game carrying sled. The structure of the present invention will be further clarified with definitions of these terms.

The term "compact" when referencing a game carrier in this application is intended to define a game carrier that can have at least one of the length, width or height of the deployed game carrier reduced to less than about 25% of its full deployed dimension. Preferred embodiments of the present invention satisfy this requirement for compactness with folding both the width and length of the disclosed game carrying sled, typically reducing the width to about ¼ of the deployed width and reducing the length to about ⅛ of the fully deployed length.

The term "flexible" when referencing a game carrier in this application is intended to define a game carrier that can be rolled, folded or otherwise compacted for storage and transport and which can bend, wrap around or conforms somewhat to the shape of the animal being carried.

The term "lightweight" when referencing a game carrier in this application is intended to define a game carrier that weighs less than about one pound (16 oz). Preferred embodiments of the present invention satisfy this requirement for lightweight by weighing about 5 oz in use, although larger embodiments (for bear for example) could be considerably heavier than the preferred embodiment and still be "lightweight" within the meaning of this application.

The phrase "game carrying sled" is defined above and is a device upon which the game is supported and the device and game is pulled along the ground.

The term "disposable" is a term in which it is almost impossible to attach a structural limitation in the patent sense. Naturally anything can be "disposable", yet practically hunters are not likely to treat game carriers costing more than one hundred dollars as a one use disposable object. Thus the term "disposable" will reference mainly the economics of the system and reinforce a design criteria or goal in which the present invention strives to keep the cost of manufacturing down sufficiently so that the resulting device is accepted by the majority of users as disposable. It should be apparent that with this loose definition of "disposable" nothing prevents a user from reusing the "disposable" game carrier of the present invention, particularly where the first use is only for a short distance over level terrain (assuming the user desires to wash the device and refold the device into an acceptable compact unit for transport).

The phrase "uniform material thickness fold line" within the meaning of this application defines a fold line that extends through a constant thickness of material, excluding holes, along the length of the fold line. Thus a uniform material thickness fold line does not extend through folded-over reinforced edges.

In accordance with non-limiting aspects of the present invention the present invention the compact lightweight flexible disposable game carrying sled may provide that the sheet is generally rectangular and has a pair of ends configured to be positioned with one end closer to the head of the game and the other end closer to the tail of the game, the sheet having a pair of sides extending between the ends with the sides configured to extend generally along the longitudinal length of the game. Shapes other than rectangular are possible, such as a generally trapezoidal shape, which may have manufacturing advantages in large scale.

Additionally, the compact lightweight flexible disposable game carrying sled according to non-limiting embodiments of the invention may provide that the tie down lines extend across the flexible sheet from side to side and longitudinally spaced locations generally parallel to the ends of the sheet. Further, in certain embodiments of the invention three tie down lines are provided and each set of holes includes at least four holes in a line generally parallel to the ends of the sheet. Further, the compact lightweight flexible disposable game carrying sled according to certain aspect of the invention may include that each of the tie down lines includes an edge lock mechanism at the sides of the sheet to prevent the tie down lines from being pulled through the set of holes during tensioning of the tie down line at attachment of the tie down lines to the game.

The compact lightweight flexible disposable game carrying sled according to certain embodiments of the invention may provide that flexible sheet is formed of a cross orientated high density polyethylene. Further, the compact lightweight flexible disposable game carrying sled according to certain aspects of the invention may provide that the compact dimensions of the game sled are less than about 3" thick, less than about 5" in width and less than about 8" in length when in a folded compact condition and at least 40" in length and 20" in width when in a deployed condition, and wherein the game sled weighs less than about 12 ounces, preferably less than 10 ounces and most preferably about 5 ounces.

The particular advantages of the present invention will be described in connection with the attached figures wherein like reference numerals represent like elements throughout.

BRIEF DESCRIPTION OF THE DRAWINGS

FIG. 1 is a schematic plan view of a compact, lightweight, flexible disposable game carrying sled to assist hunters in transporting game from generally remote hunting locations according to the present invention with the game carrying sled illustrated adjacent game with a conventional game drag schematically shown attached thereto;

FIG. 2 is a schematic plan view of the game carrying sled of FIG. 1 with the game positioned there on with the sled configured to be attached to the game;

DETAILED DESCRIPTION OF THE PREFERRED EMBODIMENTS

Figure 3:
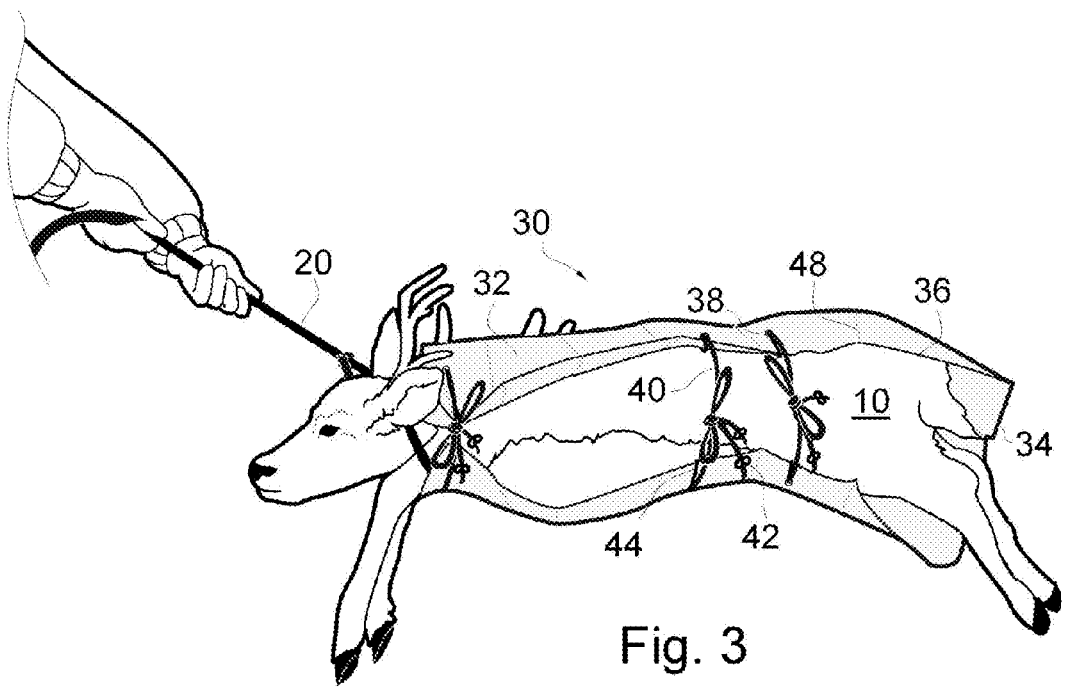
FIG. 3 is a schematic plan view of the game carrying sled of FIG. 1 coupled to the game and in use as a game carrying sled.

FIGS. 1-3 schematically illustrate a game carrying sled 30, namely a device used to reduce the force needed to drag an animal 10 (Game 10, namely deer) across the ground. The sled 30 is a compact lightweight flexible disposable game carrying sled comprising a flexible sheet 32 configured to receive game 10 thereon and be dragged along the ground during transport of the game 10.

The sheet 32 is preferably lightweight, tear resistant, puncture resistant and formed of a material that reduces friction during game transport, thus it should exhibit toughness and slickness. Suitable material for the sheet 32 includes forming the sheet 32 of a cross orientated high density polyethylene (HDPE), which may be multilayered. Examples of such material is sold under the VALERON® brand. Material sold under the TYVEX® brand may also be a suitable alternative, although the VALERON® brand material exhibits a greater reduction in pulling force (i.e. less friction) necessary for game transport. Other polymers and composite material may be suitable. Further a multi-layer laminated composition could be designed. The disposable aspect of the design suggests that the costs and fitness for the particular application must all be considered in selecting the material, and the VALERON® brand product is highly advantageous in satisfying these design criteria.

The sheet 32 should be large enough only to accommodate a reasonable range of larger game 10 that are conventionally used with a game drag 20, most commonly deer. Providing too large of a sheet 32 increases the bulkiness of the overall product as well as the expense of the system. The increase in size of the product makes it less acceptable to hunters who desire to minimize the material they carry into the woods. The increase in the costs to manufacture will make the sled 30 less desirable as a disposable unit.

The sheet 32, as shown, is generally rectangular and has a pair of ends 34 configured to be positioned with one end closer to the head of the game 10 and the other end 34 closer to the tail of the game 10 as shown. The end 34 to end 34 distance of the sheet 32 is generally the length of the sled 30, and the length of the sled should be about 40" to about 72", with 40" to about 65" being more preferential and about 50" being preferred.

Shapes other than the rectangle as shown are possible. For example, a trapezoidal shape could be designed which could save material and weight and possible compact size. In such a special shape the narrow end would be at the neck of the game 10 where less material is required. These advantages for this proposed trapezoidal shape, or any specialized shape, must be balanced with the costs of manufacturing, i.e. specialized dies for cutting the material in non-rectangular shapes. It is anticipated that for high production runs the specialized shapes, such as a trapezoid having the narrow base forming the end 34 near the neck, will offer overall advantage to the sled 30

The sheet 32 has a pair of sides 36 extending between the ends 34 with the sides 36 configured to extend generally along the longitudinal length of the game 10 as shown. The side 36 to side 36 distance of the sheet 32 is generally the width of the sled 30, and the width of the sled should be about 20" to about 32", or about 23"-28" being more preferable and about 25" being most preferred.

The sheet 32 needs sufficient thickness to provide sufficiency for operation over some distance. With the identified materials, such as the VALERON® polymer, a thickness of about 3-10 mils is acceptable with about 5-8.5 mils being more preferable and about 6.5 mil being a preferred thickness of the identified materials, balancing durability with cost and compactness and flexibility.

The sheet 32 includes a plurality of sets of holes 38 in the flexible sheet 32 at spaced locations along the flexible sheet 32, with each set of holes 32 including at least two holes 38 which define a line. In the particular embodiment shown, the sets of holes 38 are in groups of five holes at spaced locations along the length of the sheet 32 generally parallel to the ends 34 of the sheet 32.

A plurality of tie-down lines 40 is included with the sled 30. Each tie down line 40 is associated with one set of holes 38 with the tie down line 40 weaving or interlaced through the set of holes 38 to couple the line 40 to the flexible sheet 32. The tie down lines 40 are configured to completely encircle the game 10 that is placed on the flexible sheet 32 to secure the game 10 to the sheet 32 in use, as shown. The greater the number of holes 38 in each set will increase the coupling of the sheet 32 to the game 10 at that tie-down line 40 location and will (minimally) decrease the weight of the sheet 32. Further the weaving of the tie-down line 40 through the holes 38 will keep some of the tie down line 40 off of the ground during operation which can assist in reducing wear on the tie down line 40 during operation and prevent opportunity of ground debris to snag the line, which would decrease the efficiency of the compact lightweight flexible disposable game carrying sled 30. However the increase of the holes 38 in each set of holes will increase the manufacturing steps, and there is an effective upper limit on the holes 38 at a point where they disrupt the integrity of the sheet 32. A balance of these factors indicates that two to twelve holes 38 is an acceptable range for the number of holes 38 in each set of holes 38. The number of holes 38 in each set does not need to be equal across the sheet 30, for example a greater number of holes 38, such as eight holes 38, may be provided at the leading tie down line 40 location near the head of the game 10 to securely "cinch" the sled 30 to the neck of the game 10, while the remaining tie down lines 40 may weave through a lesser number of holes 38, such as four holes 38.

As shown in FIG. 3, three tie down lines 40 extend across the flexible sheet 32 from side 36 to side 36 and at longitudinally spaced locations generally parallel to the ends 34 of the sheet 32. Each of the tie down lines 40 includes an end knot 42 to resist or retard pull through during tensioning of the lines 40 during attachment to the game 10 and in operation. An alternative design forms a large loop (not shown) or eyelet (not shown) may be used on one end or both ends of a tie down line in place of the end knot(s) 42 to speed the tie down operation. In this alternative the end knot 42 can be more quickly threaded through the loop and the tie down line 40 quickly tightened and tied off. The loop also helps the users to more firmly tighten the rope. The provision of such a speed cinching device should be balanced with the increase in cost, if any.

Each tie down line 40 as shown in FIG. 3 includes an edge lock mechanism 44 at the sides 36 to prevent the tie down lines 40 from bunching the sheet 32 or being pulled through the set of holes 38 during tensioning of the tie down line 40 at attachment of the tie down lines 40 to the game 10 and while in use. The edge lock mechanism 42 is formed by looping the tie down line 40 around the side 36 and back through the hole 38 located closest to the side 36. Other edge lock mechanisms are possible, but the one illustrated allows the sled 30 to be inexpensively manufactured so as to better accommodate a desired disposable function.

The tie down line 40 is preferably a polypropylene, polyester or nylon twine having a 1-4 millimeter diameter, with 1.5-2.5 millimeter diameter twine being preferred. While both thinner or thicker lines will work, in sizing the tie down line 40 the main concern is balancing the needed strength for the line 40 with the costs of the line 40. All lines 40 in the sheet 32 do not need to be the same thickness or color. In the current embodiment, the line 40 near the top (neck) end 34 is thicker than the lower lines.

The sled 30 includes a plurality of uniform material thickness fold lines 46 and 48 extending across the flexible sheet, wherein at least two of the fold lines 46 and 48 intersect. The phrase "uniform material thickness fold line" for fold lines 46 and 48 within the meaning of this application defines a fold line that extends through a constant thickness of material, excluding holes, along the length of the fold line. Thus a uniform material thickness fold line 46 and 48 does not extend through folded over reinforced edges or hems or the like. A reinforced edge is shown for example in the embodiment of FIG. 8 at the forward end of the resulting sled 30 in the use position. Having a fold line extend through any reinforced edge increases the bulk of the folded unit, essentially doubling such bulk and greatly decreasing the overall compactness that can be achieved in the stored unit. A more traditional reinforced edged is formed by stitching and such edge finishing greatly increases the costs of the unit making is far more difficult to achieve a cost effective "disposable unit". The present invention is intentionally designed to be sufficiently inexpensive in manufacture as to be easily "disposable" in the minds of the consumer. The sled 30 of the invention, of course can be, preferably cleaned, refolded, and reused by the user, but it is designed so as to be commercially acceptable as a disposable unit.

Figure 4:
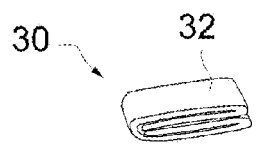
FIG. 4 is a schematic plan view of the game carrying sled of FIG. 1 in a compact stored position prior to use.

The flexible sheet 32 is configured to be folded along the fold lines 46 and 48 to form a compact structure as shown in FIG. 4, for example (with the tie down lines 40 "folded into" the sheet 32 for storage and for transport when not in use and configured to be unfolded when the game sled is to be used. The compact dimensions of the game carrying sled 30 are less than about 4" thick, more preferably less than about 2" thick, and most preferably about 1¼" thick; less than about 8" in width, more preferably less than about 5" in width, and most preferably about 4" in width; and less than about 12" in length, more preferably about 8" in length, and most preferably about 6½" when in a folded condition. The most preferred dimensions and weights given are for a sled 30 designed for medium large game 10 such as deer, while larger designs for larger game 10 such as bears will naturally be larger. The compact lightweight flexible disposable game carrying sled 30 weighs less than about 12 ounces, preferably less than 10 ounces, more preferably less than about 8 ounces and most preferably about 5 ounces.

The sheet 32 as shown includes logo 50 or other textual matter on the sheet. The logo 50 and/or associated text can serve a variety of purposes. The logo 50 will serve traditional trademark and advertising purposes. More functionally the associated text can be used to provide operational instructions or guidance to the user. It may include instructions for field dressing and attaching the sled 30 and use of the sled 30. Further the logo 50 may be in "hunter" orange or any color that is not the standard brown color of a deer (or the sheet 32 may be in "hunter" orange or any color that is not the standard brown color of a deer with the logo 50 contrasting) as a safety device. In operation the sled 30 will be used to drag a harvested game 10, such as a white tail deer, through a hunting area. The inclusion of hunter orange in the logo 50 (or sheet 32) or any color or pattern of colors (such as a camouflage pattern like the Mossy Oak®, RealTree® and OakTree™ patterns)_that is not the standard brown color of a deer is believed to offer safety advantages to prevent other hunters from targeting game 10 as it is being transported (even though experienced hunters should not target obscured targets). The color of the drag 20 and use of ear/antler tags further assist in highlighting that the harvested game is not a viable target for hunters in the area.

Figure 5:
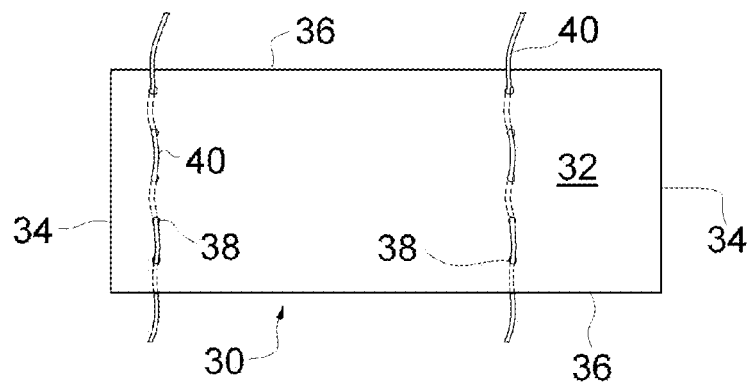
FIG. 5 is a schematic plan view of a compact, lightweight, flexible disposable game carrying sled to assist hunters in transporting game from generally remote hunting locations according to another embodiment of the present invention.
Figure 6:
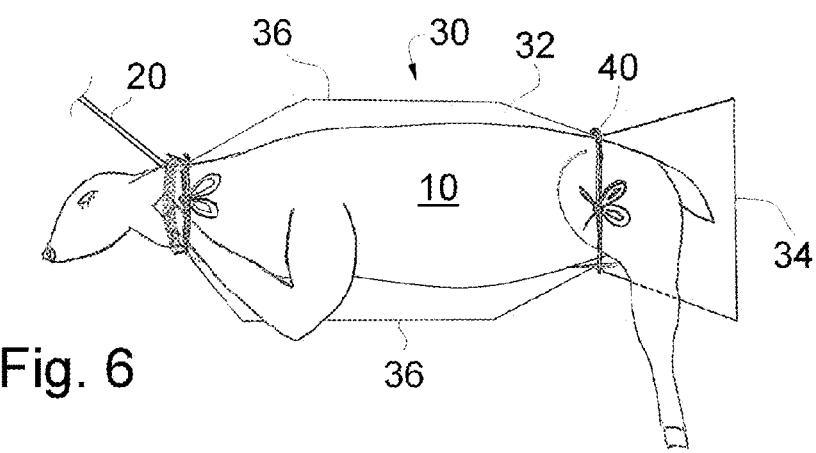
FIG. 6 is a schematic plan view of the game carrying sled of FIG. 5 coupled to the game and in use as a game carrying sled.
Figure 7:
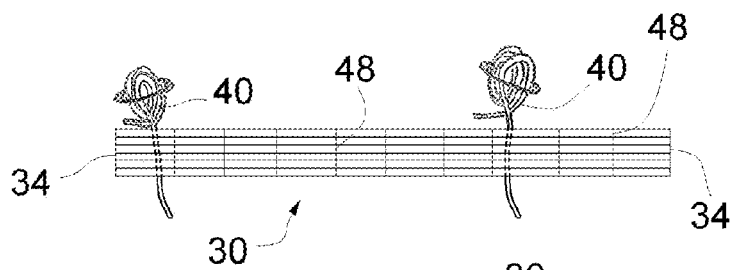
FIG. 7 is a schematic view of a partially folded game carrying sled of FIG. 5.

FIGS. 5-6 illustrate an embodiment of the invention that includes only two tie down lines 40 showing one alternative of the present design. The sled 30 of FIGS. 5-6 also omits the knots 42 and edge locking features of the sled 30 of FIGS. 1-4. FIG. 7 illustrates the sled 30 of FIGS. 5-6 with longitudinal folds 46 used to partially fold the sled 30, and in this embodiment the tie down lines 40 can be pulled through the holes 38 (due to omission of the edge locking 42 feature) as shown for storage.

Figure 8:
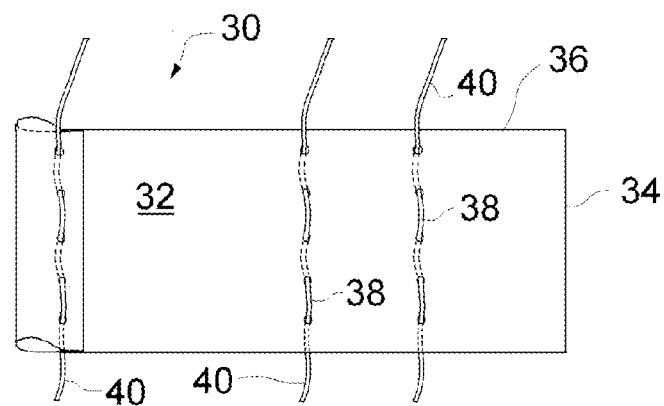
FIG. 8 is a schematic plan view of a compact, lightweight, flexible disposable game carrying sled to assist hunters in transporting game from generally remote hunting locations according to another embodiment of the present invention.

FIG. 8 illustrates a further modified embodiment in which the leading edge is "doubled over" as shown and held in place by a combination of aligned holes 38 with the interwoven tie down line 40 as shown. The doubled over leading edge can provide an attachment point of the game drag 20 or simply reinforce the leading edge of the sled 30 to better maintain sled integrity as it traverses the ground. In this embodiment, if longitudinal folds 46 are used then such folds 46 here would not be uniform material thickness fold lines as defined herein; however the detrimental effect can be negated if the length of the doubled leading edge is set the same as the distance between folds 48.

A person would use the sled 30 of the invention in the following way; First, they would usually complete the field dressing of their harvested animal 10 and then lay the game 10 on its side with all four legs laying in one direction. Then they would attach their standard dragging rope or device 20 to the animal 10. In doing so, it is often best (but not necessary) to tie the front legs of the game 10 onto the neck of the animal 10 with the game drag 20.

One would then remove the sled 30 from any packaging that it is stored or carried in and they would unfold the longitudinal and transverse folds 46 and 48 and place the tie down lines 40 off to the sides of the sheet 32. Next, the user will place the sled 30 of the invention on the ground along the back of the game animal 10. The user should position the leading tie down line 40 near the neck region of the animal 10 and the remaining body tie down lines 40 near the stomach region.

The user will roll the animal 10 onto its other side and onto the sheet 32 of the sled 30 of the invention. The user must be sure that the sheet 32 of the sled 30 of the invention is between the carcass/hide of the animal 10 and the ground and covering the majority of the bottom of the hide of the animal 10. Next the user shall firmly, tie the leading tie-down line 40 around the animal's neck region, followed by firmly, the remaining lines 40 around the animal's stomach region. Following these steps, the sled 30 of the invention is in place and ready to use. The sled 30 is used when the user pulls on their standard dragging rope or device 20 as they normally would if the invention would not be in place. The invention can greatly reduce the force needed to transport game 10 and will act to protect the hide of the animal 10. The sled 30 of the invention could be used to transport other objects, including humans, which need to be dragged across the ground.

The material of the sheet 32 allows the present invention to be well suited to be used as a rain shield. The sheet 32 could also be used to form a hunting blind but that would suggest forming at least one side (the ground engaging side) of the sheet 32 in a camouflage pattern. These uses could increase the utilitarian advantages of the sled 30, but would need the sled to be easily re-folded by the user in case an animal is not used when the sled 30 is used in one of the additional applications.

As noted above the current prior art drag reducing devices are large, heavy, cumbersome, and complicated. Some also require the user to exert pull force directly onto the device and not onto the animal. These aspects are undesirable to the users since the hunters are demanding very light, small, and easy to use devices. Additionally, the aspects of the current prior art devices make them impractical to use in the field and very expensive to manufacture and buy. The sled 30 of the present invention is less complicated, smaller, lighter, lower cost, disposable, and easier to use. Additionally, it only covers the bottom portion of the animal 10. It allows the user to exert pull force onto the animal 10. These aspects combine to allow the user to be able to carry it into the field without adding noticeable weight or bulk to their self or pack and then to easily use the invention in the field.

Although the present invention has been described with particularity herein, the scope of the present invention is not limited to the specific embodiment disclosed. It will be apparent to those of ordinary skill in the art that various modifications may be made to the present invention without departing from the spirit and scope thereof.

What is claimed is:

1. A compact lightweight flexible disposable game carrying sled comprising:
   A flexible sheet configured to receive game thereon and be dragged along the ground during transport of the game wherein the sheet includes a pair of ends extending the width of the carrying sled and a pair of sides extending between the ends;
   A plurality of sets of holes in the flexible sheet at spaced locations along the flexible sheet, with each set of holes including at least two holes along a line extending across the sheet from one side to the other side of the carrying sled between the ends of the carrying sled;
   A plurality of tie down lines, each tie down line associated with one set of holes with the tie down line weaving through the set of holes to couple the line to the flexible sheet, and wherein the tie down lines are configured to encircle the game that is placed on the flexible sheet to secure the game to the sheet in use;
   A plurality of uniform material thickness fold lines extending across the flexible sheet, wherein at least two of the fold lines intersect, and wherein the flexible sheet is configured to be folded along the fold lines to form a compact structure for storage and for transport when not in use and configured to be unfolded when the game carrying sled is to be used;
   Wherein the game sled weighs less than about 12 ounces.

2. The compact lightweight flexible disposable game carrying sled according to claim 1 wherein the sheet is generally rectangular and wherein the pair of ends is configured to be positioned with one end closer to the head of the game and the other end closer to the tail of the game.

3. The compact lightweight flexible disposable game carrying sled according to claim 2 wherein the tie down lines extend across the flexible sheet generally parallel to the ends of the sheet.

4. The compact lightweight flexible disposable game carrying sled according to claim 3 wherein three tie down lines are provided and each set of holes includes at least four holes in a line generally parallel to the ends of the sheet.

5. The compact lightweight flexible disposable game carrying sled according to claim 3 wherein each of the tie down lines includes an edge lock mechanism at the sides to resist the tie down lines from being pulled through the set of holes during tensioning of the tie down line at attachment of the tie down lines to the game and when in use.

6. The compact lightweight flexible disposable game carrying sled according to claim 3 wherein flexible sheet is formed of a multi-layer cross orientated high density polyethylene.

7. The compact lightweight flexible disposable game carrying sled according to claim 3 wherein the compact dimensions of the game sled are less than about 3" thick, less than about 8" in width and less than about 8" in length when in a folded condition and at least 40" in length and 20" in width when in a deployed condition.

8. The compact lightweight flexible disposable game carrying sled according to claim 3 wherein at least three uniform material thickness fold lines extending across the flexible sheet extend from end to end and at least five uniform material thickness fold lines extending across the flexible sheet extend from side to side.

9. A compact lightweight flexible disposable game carrying sled comprising:

A flexible high density polyethylene sheet configured to receive game thereon and be dragged along the ground during transport of the game, wherein the sheet has a pair of ends configured to be positioned with one end closer to the head of the game and the other end closer to the tail of the game, the sheet having a pair of sides extending between the ends with the sides configured to extend generally along the longitudinal length of the game;

A plurality of sets of holes in the flexible sheet at spaced locations along the flexible sheet, with each set of holes including at least three holes along a line; and A plurality of tie down lines, each tie down line associated with one set of holes with the tie down line weaving through the set of holes to couple the line to the flexible sheet, wherein the ties down lines extend across the flexible sheet from side to side and wherein the tie down lines are configured to completely encircle the game that is placed on the flexible sheet to secure the game to the sheet in use, and wherein each of the tie down lines includes an edge lock mechanism at the sides to prevent the tie down lines from being pulled through the set of holes during tensioning of the tie down line at attachment of the tie down lines to the game and when in use;

Wherein compact dimensions of the game carrying sled are less than about 3" thick, less than about 5" in width and less than about 8" in length when in a folded condition.

10. The compact lightweight flexible disposable game carrying sled according to claim 9 further including a plurality of uniform material thickness fold lines extending across the flexible sheet, wherein at least two of the fold lines intersect, and wherein the flexible sheet is configured to be folded along the fold lines to form a compact structure for storage and for transport when not in use and configured to be unfolded when the game carrying sled is to be used.

11. The compact lightweight flexible disposable game carrying sled according to claim 10, wherein the sheet is at least 40" in length and 20" in width when in a deployed condition.

12. The compact lightweight flexible disposable game carrying sled according to claim 11 wherein the ties down lines extend across the flexible sheet generally parallel to the ends of the sheet.

13. The compact lightweight flexible disposable game carrying sled according to claim 12 wherein the game sled weighs less than about 12 ounces.

14. The compact lightweight flexible disposable game carrying sled according to claim 13 wherein at least three uniform material thickness fold lines extending across the flexible sheet extend from end to end and at least five uniform material thickness fold lines extending across the flexible sheet extend from side to side.

15. The compact lightweight flexible disposable game carrying sled according to claim 10 wherein at least three uniform material thickness fold lines extending across the flexible sheet extend from end to end and at least five uniform material thickness fold lines extending across the flexible sheet extend from side to side.

16. A compact lightweight flexible disposable game carrying sled comprising:

A flexible high density polyethylene sheet configured to receive game thereon and be dragged along the ground during transport of the game, wherein the sheet has a pair of ends configured to be positioned with one end closer to the head of the game and the other end closer to the tail of the game, the sheet having a pair of sides extending between the ends with the sides configured to extend generally along the longitudinal length of the game;

A plurality of tie down lines coupled to the flexible sheet, and wherein the tie down lines are configured to secure the game to the sheet in use and wherein the ties down lines extend across the flexible sheet from side to side in positions spaced from the ends; and A plurality of uniform material thickness fold lines extending across the flexible sheet, wherein at least two of the fold lines intersect, and wherein the flexible sheet is configured to be folded along the fold lines to form a compact structure for storage and for transport when not in use and configured to be unfolded when the game sled is to be used, wherein at least three uniform material thickness fold lines extending across the flexible sheet extend from end to end and at least five uniform material thickness fold lines extending across the flexible sheet extend from side to side.

17. The compact lightweight flexible disposable game carrying sled according to claim 16 wherein the compact dimensions of the game sled are less than about 2" thick, less than about 5" in width and less than about 8" in length when in a folded condition and at least 50' in length and 20" in width when in a deployed condition.

18. The compact lightweight flexible disposable game carrying sled according to claim 17 wherein the game sled weighs less than about 12 ounces.

\* \* \* \* \*